United States Patent
Link et al.

(10) Patent No.: US 6,681,938 B1
(45) Date of Patent: Jan. 27, 2004

(54) DEVICE AND METHOD FOR SEPARATING MINERALS, CARBON AND CEMENT ADDITIVES FROM FLY ASH

(75) Inventors: Thomas A. Link, Smock, PA (US); Micael R. Schoffstall, South Park, PA (US); Yee Soong, Monroeville, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 35 days.

(21) Appl. No.: 09/878,196

(22) Filed: Jun. 12, 2001

(51) Int. Cl.[7] .................................................. B03C 7/00
(52) U.S. Cl. .................... 209/12.2; 209/127.4; 209/129
(58) Field of Search ........................... 209/12.2, 127.1, 209/127.3, 127.4, 128, 129, 130, 241, 247, 250

(56) References Cited

U.S. PATENT DOCUMENTS

| | | | | |
|---|---|---|---|---|
| 2,754,965 A | * | 7/1956 | Lawver | 209/127.4 |
| 2,805,770 A | * | 9/1957 | Lawver | 209/127.2 |
| 2,881,916 A | * | 4/1959 | Cook | 209/3 |
| 3,493,109 A | * | 2/1970 | Carta et al. | 209/11 |
| 3,724,755 A | * | 4/1973 | Diamond et al. | 239/693 |
| 4,340,142 A | * | 7/1982 | de la Burde et al. | 209/11 |
| 4,374,652 A | * | 2/1983 | Zahedi et al. | 55/479 |
| 4,505,723 A | * | 3/1985 | Zahedi et al. | 361/230 |
| 5,477,285 A | * | 12/1995 | Riddle et al. | 396/546 |
| 5,944,875 A | * | 8/1999 | Stencel et al. | 209/127.1 |
| 6,017,381 A | * | 1/2000 | Dunn et al. | 95/3 |

* cited by examiner

*Primary Examiner*—Donald P. Walsh
*Assistant Examiner*—Joseph C Rodriguez
(74) *Attorney, Agent, or Firm*—Joy Alwan; Thomas G. Anderson; Paul A. Gottlieb

(57) ABSTRACT

A process for separating organic and inorganic particles from a dry mixture by sizing the particles into isolated fractions, contacting the sized particles to a charged substrate and subjecting the charged particles to an electric field to separate the particles.

13 Claims, 7 Drawing Sheets

DEVICE AND METHOD FOR SEPARATING MINERALS, CARBON AND CEMENT ADDITIVES FROM FLY ASH

CONTRACTUAL ORIGIN OF INVENTION

The United States Government has rights in this invention pursuant to the employer-employee relationship of the United States Government to the inventors as U.S. Department of Energy employees at National Energy Technology Laboratory.

BACKGROUND OF THE INVENTION

1. Field of the Invention

The invention relates to a device and a method for the recovery and utilization of fly ash as a source of high purity carbon, ash, and minerals, and, more specifically, this invention relates to a new device and method for isolating fly ash components on the basis of size and electrical charge.

2. Background of the Invention

Improved beneficiation and utilization schemes for fly ash can transform it from a waste material, with associated disposal costs, to a valuable product. The utilization of power-plant-derived fly ash has been impacted by recent shifts to low $NO_x$ burners which can increase the carbon content of the ash above the specification for its use in Portland cement. The ability to efficiently extract high purity carbon, ash and minerals is important in the development and application of cost-effective beneficiation technologies for fly ash separation. There is technology in use in this field, but much of the technology is carried out in aqueous solutions. Dry separation methods exist; but, they do not differentiate significantly among the different substances in a complex dry mixture such as fly ash.

Electrostatic separation methods are well known in the art. U.S. Pat. No. 3,493,109 awarded to Carta et al. on Feb. 3, 1970, discloses a method which utilizes electrostatic separation, or more specifically triboelectrostatic separation. Particles become positively charged, negatively charged, or remain electrically neutral, hence triboelectrostatic. There are other examples of the electrostatic separation process, but improvements in separation efficiency are still possible. More specifically, most prior art apparatus and methods for electrostatic separation of particles generally suffer substantial inefficiencies resulting from turbulent flow conditions.

U.S. Pat. No. 5,944,875 awarded to Stencel et al. on Aug. 31, 1999 discloses a triboelectrostatic separation apparatus having a mixing chamber, a pre-separator, and only three different means of particle egress, based on positive charge, negative charge, or neutral charge of the particle.

Another Stencel patent (U.S. Pat. No. 5,938,041 awarded on Aug. 17, 1999) discloses a triboelectrostatic separation apparatus with only three different means of particle egress.

U.S. Pat. No. 5,299,692 awarded to Nelson et al. on Apr. 5, 1994 discloses a method employing an inclined surface and two vibratory sources for concentration of fly ash into a lighter, high carbon fraction and a heavier enhanced fraction. An electrostatic charging method of separation is not provided.

U.S. Pat. No. 4,652,433 awarded to Ashworth, et al. on Mar. 24, 1987 discloses a separation method which comprises sieving, flotation, dry magnetic separation, acid leaching, and the use of ion-exchange resins. It does not provide an electrostatic method of separation.

U.S. Pat. No. 4,539,187 awarded to Russ, et al. on Sep. 3, 1985 discloses a method for the separation and recovery of substantially pure Al, Fe, and silica from fly ash. The process involves chemical steps which utilize aqueous acids and does not provide for a dry physical method of separation.

U.S. Pat. No. 4,386,057 awarded to Dobbins, et al. on May 31, 1983 discloses a method for separating and recovering iron oxide from coal fly ash via dissolution of magnetic portion of fly ash in strong alkali solution and does not provide for a dry physical method of separation.

U.S. Pat. No. 4,130,267 awarded to Russ et al. on Dec. 19, 1978 discloses a process for recovering mineral values from fly ash which includes forming an alkaline aqueous fly ash blend. Russ et al does not provide for a dry physical method of separation.

U.S. Pat. No. 4,121,945 awarded to Hurst et al. on Oct. 24, 1978 discloses a wet process for obtaining a carbon concentrate and iron concentrate from fly ash and does not provide for a dry physical method of separation.

A need exists in the art for a method and device for separating out the components of fly ash in a single phase, i.e., without the need for aqueous or nonaqueous separation techniques. The method and device should separate the components based on size and electrical charge to effect a more thorough separation result. And the method and device should allow for the separation of a myriad of different sized particles and particle charges.

SUMMARY OF INVENTION

An object of the present invention is to provide a method of efficiently extracting high purity carbon, ash and minerals from fly ash that overcomes many of the disadvantages of the prior art.

Another object of the present invention is to provide a new method for using triboelectrostatic separation to concentrate the different components of fly ash. A feature of the invention is that certain moieties of the ash become electrically charged while other moieties remain electrically neutral. An advantage is that all of the moieties are simultaneously separated based on their electrical charge and size.

Still another object of the present invention is to provide a method of removing unburned carbon from fly ash. A feature of the invention is imparting a positive charge to the unburned carbon. An advantage of the invention is that the positive charge on the unburned carbon facilitates its isolation from other components of the fly ash.

It is another object of the present invention to provide a device for removing selected materials from fly ash. A feature of the invention is that the device exploits size differences and electric charge differences of the materials to effect isolation of specific sized and charged materials from remainder portions of the fly ash. An advantage of the device is that a more efficient isolation of target fly ash components is realized.

Yet another object of the present invention is to provide a device for isolating particles having a certain size, from fly ash. A feature of the invention is the provision for a means to continuously remove particles, based on size, from a fly ash feed stream. An advantage of the invention is that the fractions are continuously isolated from each other based on size and/or charge, and then removed, all during operation of the device, therefore minimizing downtime during the fraction collection.

Briefly, the invention provides a process for removing organic and inorganic particles, based on their electric charge and size, from a dry mixture, comprising sizing the mixture into a plurality of particle fractions, isolating the fractions from each other; contacting the isolated fractions to a charged substrate to create charged and uncharged particles; and subjecting the particles to an electric field.

A device for separating particles from a mixture is also provided, the device comprising a means for sizing the particles; a means for contacting the particles with a means for imparting electric charge to the particles; a means for subjecting the sized particles to an electric field; and a means for separating and then collecting the particles based on particle size and charge.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

This invention provides a device and a process for separating components of a dry mixture, based on size an electric charge. The invented process and device can be applied to an array of solid mixtures, different in mass, and/or triboelectric properties. As such, the invention can be applied to such common solid mixtures (both neat and heterogeneous) such as fly ash, paint (e.g., dry paint interspersed with glass or plastic beads as a result of sandblasting operations), fine mineral ore, food processing, and fine powder processing. For illustration purposes only, the processing of ash, and particularly fly ash will be discussed.

The invention isolates the components of fly ash, reduces the quantity of waste produced relative to other fly ash separation processes, and maximizes the yields of valuable minerals such as cenospheres (hollow, spherical coal structures), calcium oxide (CaO), magnesium oxide (MgO), carbon, magnetite ($Fe_3O_4$), alumina ($Al_2O_3$), iron oxide ($Fe_2O_3$), and silicon oxide ($SiO_2$). The process can be used to upgrade dry fly ash, wherein certain mineral fractions and/or impurities from the fly ash are extracted and concentrated to increase the economic value of the fly ash and/or the extracted and concentrated products. The reduced volume of any residual material also decreases problems associated with its deposit in landfills.

This invention also relates to an improved or enhanced triboelectrostatic separator which provides for multiple means of egress for components from the separation of fly ash.

Inasmuch as the invention is based on dry separation, the invention can be used directly with the outlet of a combustor, i.e., in situ.

The process utilizes a combination of techniques based on the differences in size and density of the fly ash particles, the particles' electrostatic properties, and a novel design for the separator. The invented device and process effects separation of the fly ash into low carbon ash, high carbon ash or C (carbon) concentrate, and enhanced ash or concentrated minerals. (Enhanced ash or concentrate contains the bulk of the major minerals which were originally present in the fly ash.)

Generally, the protocol combines mechanical sizing processes with triboelectrostatic processes. The triboelectrostatic process is most efficient when dealing with a fluid containing similar sized particles. (In the fluids of interest here, carbon particles usually comprise the larger fraction, versus the relatively smaller mineral particles.) As such, to optimize the process, components of the fly ash are separated first via size to create various size fractions. Then, the individual particles within each sized fraction are isolated from each other via their charge (i.e., positive, negative, or neutral) properties.

Specifically, a first step in the process calls for separating the ash-feed into a plurality of size fractions, such as, for example, a first size or fraction (smallest), a second size or fraction (largest), and a third size or fraction (middle). These sized fractions inherently have different content. The sizing process is then followed by process for contacting the sized fractions to a means (e.g., a static mixer) for imparting charge to individual particles within each fraction. Then, the particles emerging from the mixer are separated based on their charge, or lack of it, as the particles flow through a region defined by charged surfaces.

Figure 1:
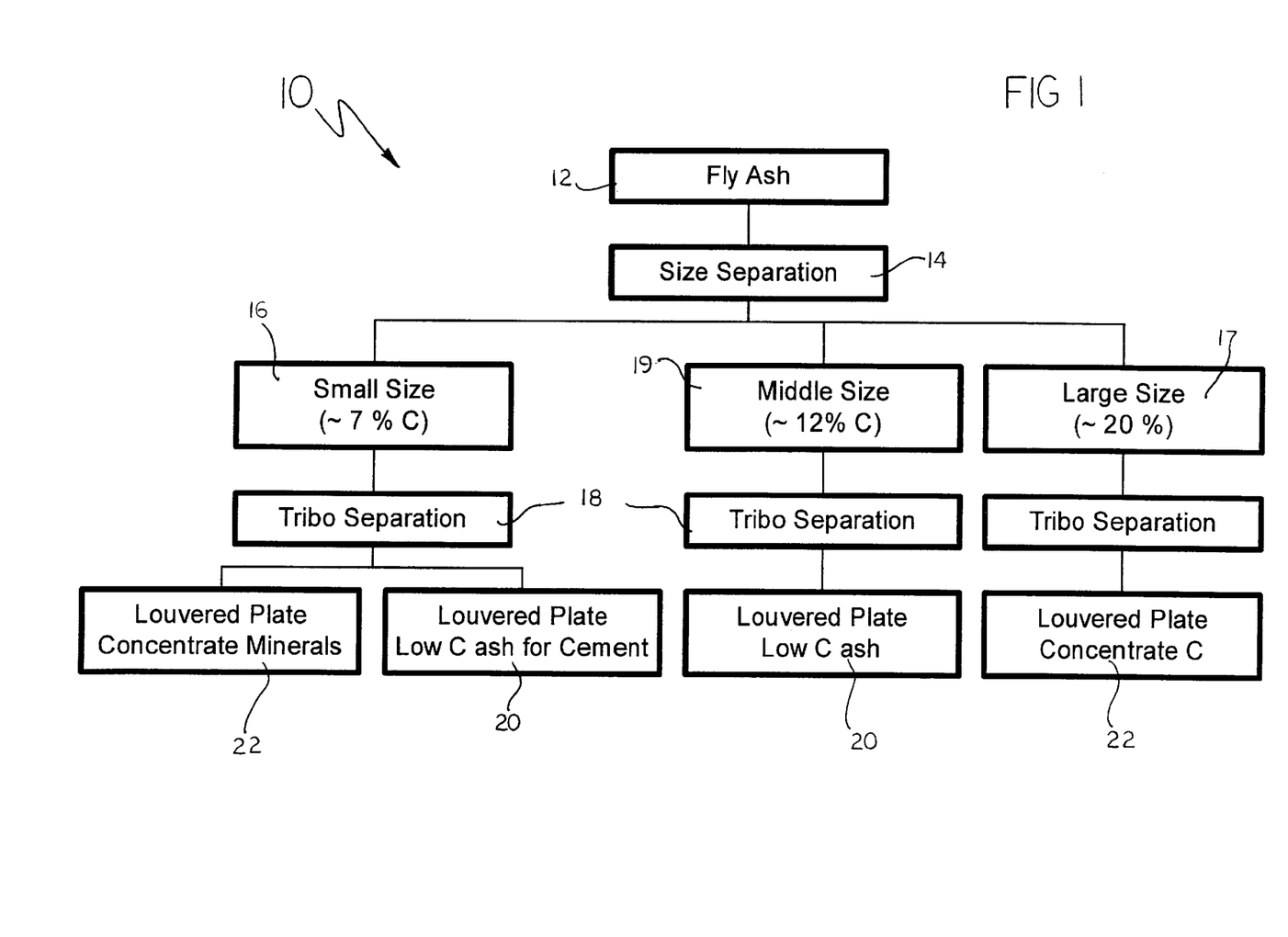
FIG. 1 is a flow chart which outlines the key steps of fly ash processing, in accordance with features of the present invention.

A schematic diagram of the process is depicted in FIG. 1 as numeral 10. This process can be located in situ or off-site from the point of fly-ash production. Whatever the scenario, a supply of fly ash 12 is required. As noted supra, the fly ash is subjected to a sizing step process. The entire fly ash mixture is contacted with a sizing means 14. Upon initial processing with the sizing means, the fly ash mixture separates into particles less than 325 mesh (the smallest fraction particles 16), greater than 200 mesh (the largest fraction particles 17), and particle sizes between 200 and 325 mesh (middle fraction particles 19).

The smallest fraction particles 16 are then subjected to triboelectrostatic processing 18. This electrostatic process 18 facilitates removal of carbon from the first-sized fly ash particles so that the remaining low carbon ash 20 can be used for cement applications. Generally, the carbon content of this low carbon ash 20 is 3 weight percent or less of the ash. For example, some of the materials obtained as a low-carbon fraction 20 have a high CaO content and can be used for special cements.

High carbon materials 22 produced from the triboelectrostatic step 18 can be used for burning purposes, as catalysts or catalyst supports, as sorbents and in possible activated carbon applications.

Figure 2:
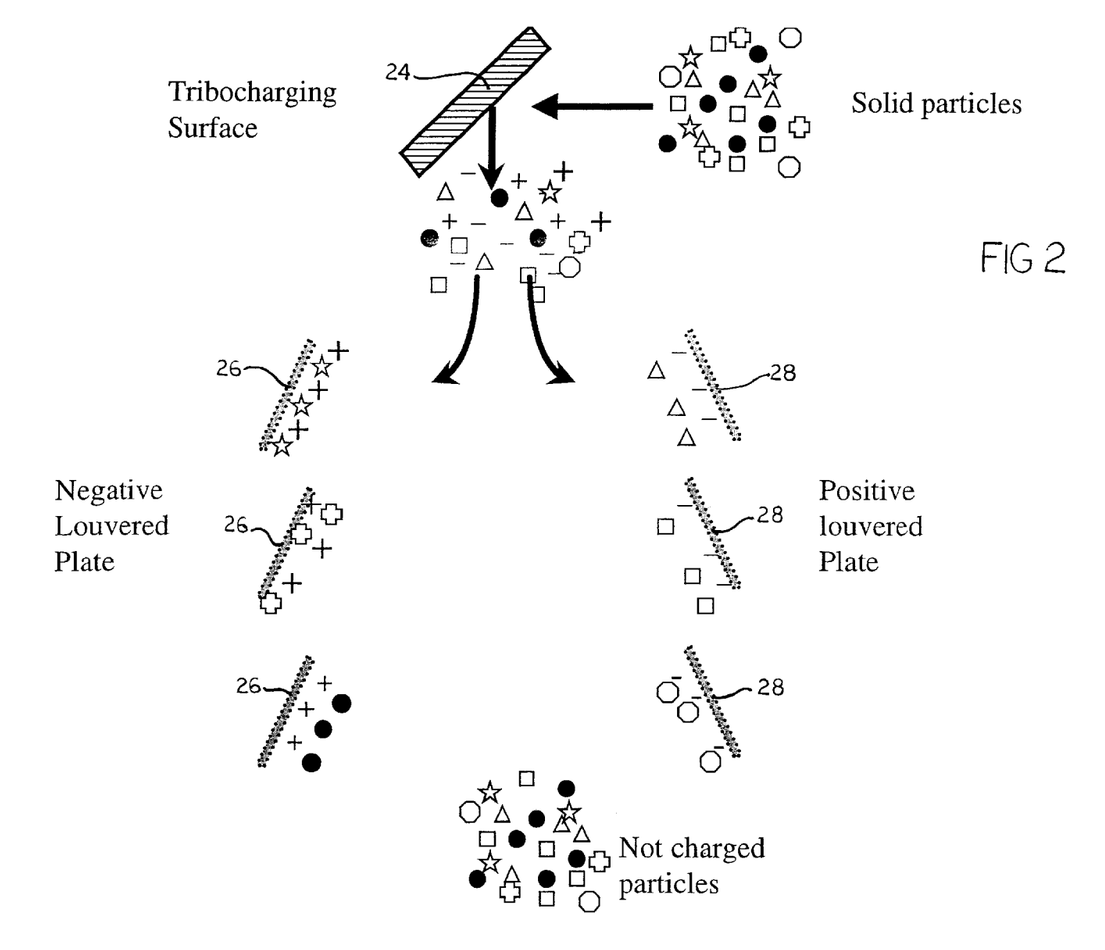
FIG. 2 is a schematic diagram of the salient features of the invented method and device, in accordance with features of the present invention.

During the triboelectrostatic process 18, organic and mineral particles are charged with opposite polarity and separated by using an electrostatic separator with louvered plates. FIG. 2 illustrates the physical principles of triboelectrostatic separation. Sized particles make contact with a charging surface 24 to impart positive, negative or no charges on the particles. The organic particles (designated as stars, crosses, and solid spheres) become positively charged. Exemplary organic compounds include, but are not limited to inertinite, isotropic coke, and anisotropic coke. Conversely, the inorganic mineral particles, such as silicates, alumina, CaO, $Fe_2O_3$, and $K_2O$, become negatively charged.

The charged and uncharged particles are then passed through an electrostatic separator consisting of a plurality of conducting electrodes or charged louvered plates, across which a high voltage is applied. The configuration of the electrical field is discussed in the Process Detail section, infra, while the effect of the application of the electrical field is discussed immediately below:

Generally, a large portion of the organic (unburned carbon) particles are attracted to the negative plates 26, and, similarly, a large portion of the mineral particles are attracted to the positive plates 28.

The louvered plates allow the device to act as a solid-phase fractionation column for separating solid particles. Solid particles deposit onto different regions of the louvered plates according to their charge to mass ratios. For example, particles with higher charge to mass ratios will deposit on plates or louvered plates proximal to the means 24 which imparts charge to the particles. Conversely, particles with lower charge to mass ratios will deposit on plates more distal from the charging means 24.

The louvered plate separator is also capable of providing multiple means of egress (as many as there are louvers or slats in the louvered plate) to obtain the desired separation of the mixture of particles.

Figure 3:
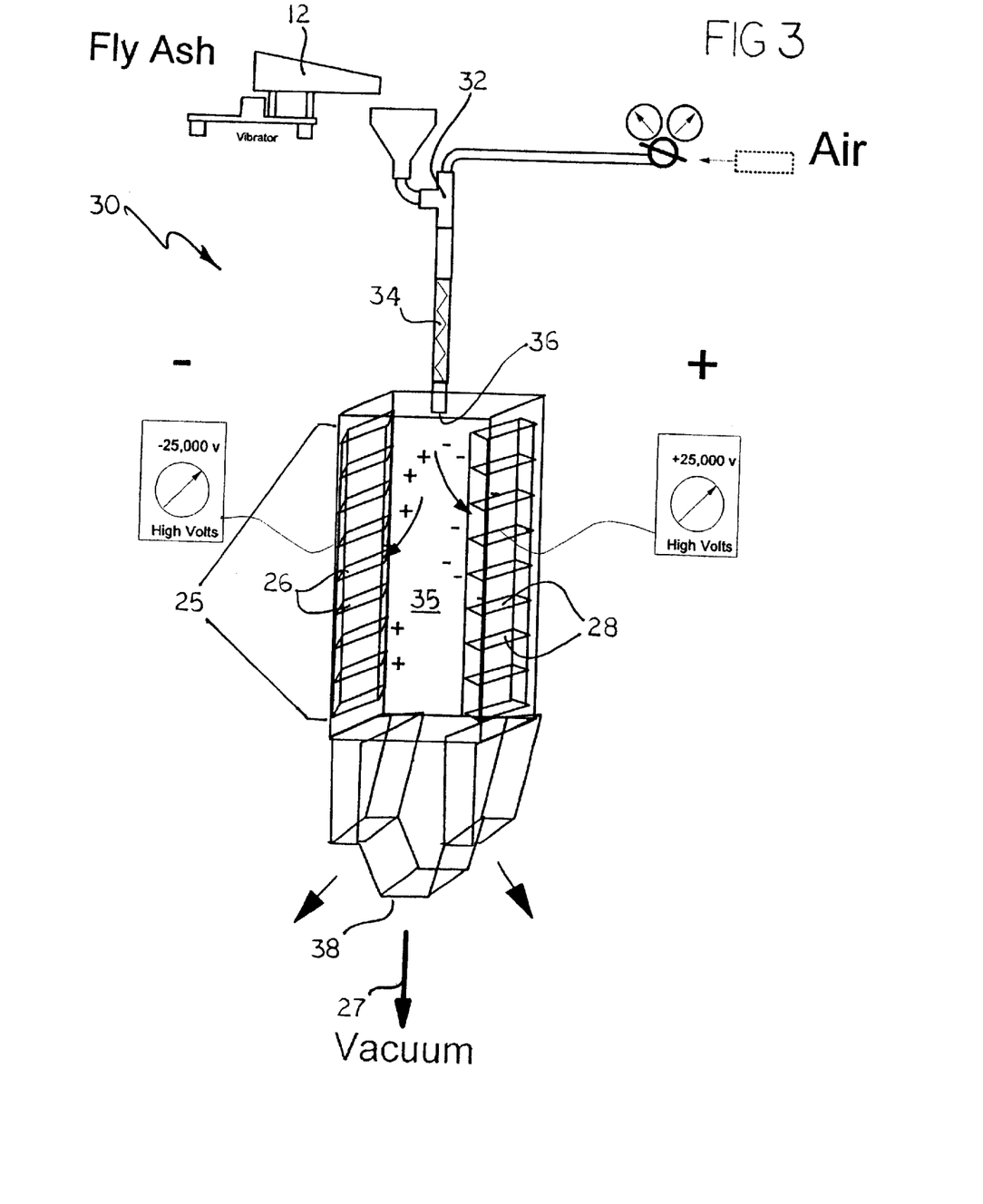
FIG. 3 is a schematic diagram of a louvered plate separator, in accordance with features of the present invention.

FIG. 3 illustrates a louvered plate triboelectrostatic separator with several means of egress defined by a series of charged plates forming a louvered plate separator 25. (The separate egress means is a straight pass-through or passage between the two charged plates by the uncharged particles.)

Two particles of different composition, having the same exact charge, but with different masses will separate with the lighter mass particle being attracted near the feed inlet and the heavier mass particle attracted near the end of the louvered plate separator. As such, heavier particles will deposit on those plates arranged most distal from the charging means 24. Similarly, lighter particles will deposit on plates arranged proximal to the charging means 24. Two particles of the same exact mass but of different composition will have different dielectric constants. One such particle will take on a greater charge than the other; and, the two particles will separate with the particle of greater charge being attracted to a plate of opposite charge near the feed inlet, and the particle of a lesser charge being attracted to a plate of opposite charge near the end of the separator.

Figure 4:
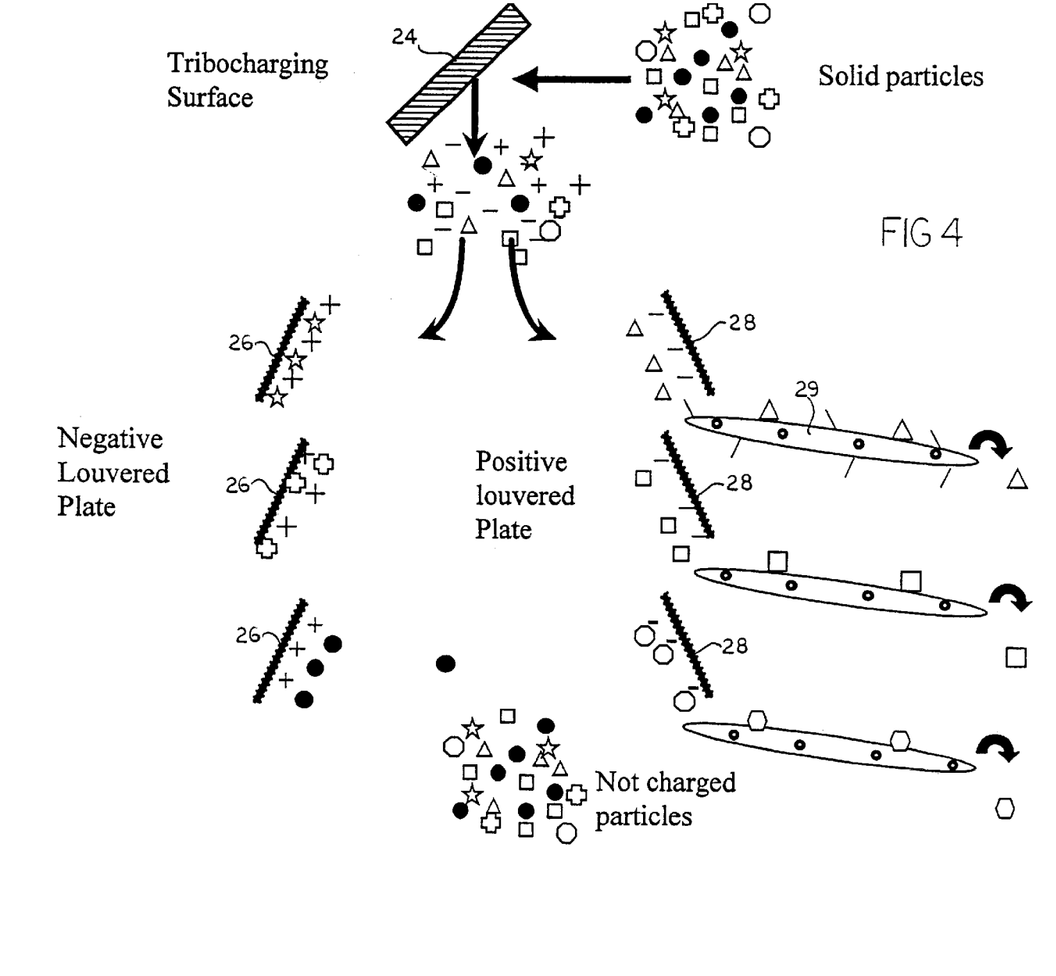
FIG. 4 is a schematic diagram of the concept of a continuous process, in accordance with features of the present invention.

The louvered plate separator is easily adapted to facilitate continuous particle collection, and while the process is operational. First, actual working of the process and device would lead to a determination as to which louvered plate or groups of plates is the collection point for a particular product (e.g., mineral, ash or carbon). Then a collection device, such as a mechanical conveyer system, so depicted in FIG. 4 as numeral 29, or a vacuum, can be juxtaposed to the selected louvered plate(s) for removal of the separated product.

Device Detail

Generally, an apparatus for performing the invented method comprises a Venturi feed system driven by compressed air pressure and an injection nozzle. A louvered plate triboseparator with the capability for multiple separated means of egress for the fractionated fly ash components also is provided. A low vacuum is applied downstream of the fly ash injection point to facilitate particle movement through the device.

A prominent feature of the device and method is the use of an electrical field to direct the movement of positively-charged particles, negatively-charged particles and neutral-charged particles. The electrical field is defined by a first set of positively charged plates arranged colinearly with each other, wherein each of the plates of the first set are spaced from each other to define a plurality of channels. Juxtaposed to this first set of plates is a second set of negatively charged plates also arranged colinearly with each other. As with the first set, each of the plates of the second set are spaced from each other to define a plurality of channels. The longitudinal axis of the second set is arranged parallel to the longitudinal axis of the first set of plates so as to define a passage between the first set and the second set. The passage is adapted to receive a fluid flow.

To facilitate flow of carrier gas or other fly ash carrier means through the plates, a means for imparting negative pressure is in fluid communication with the channels.

An exemplary device embodying salient features of the invented protocol is depicted as numeral 30 in FIG. 3. First, fly ash particles 12 pass through a venturi feeder 32 and become charged in a tribo-charger (e.g., an in-line static mixer) 34. This charge induction occurs when the particles make contact each other and with charge-inducing surfaces. Materials making up the surfaces include, but are not limited to, metal (e.g., copper, aluminum, stainless steel) or some other material which imparts electric charge (e.g., polytetrafluoroethylene, PVC, Nylon, and plastic). For example, contact of the particles with copper or polytetrafluoroethylene (the latter also known as Teflon™) tubing, especially in the turbulent zone of the in-line static mixer, results in effective charging of both carbon and mineral impurities. As discussed supra, the particles' charging characteristics are dependent on the type of tribocharger used (e.g., copper or Teflon).

The charged particles are then forced out of the feed inlet at a nozzle 36 in a ribbon of particles. At this juncture, the particles experience a slight pressure drop. The purpose of the Venturi feeder is to create enough turbulence in the reaction zone, 34 so the particles can collide with the charge-inducing surfaces and each other and become electrically charged. The pressure drop associated with the Venturi effect provides a negative pressure, relative to the ambient pressure present outside the periphery of a particle-plate contact zone 35 of device. This pressure drop can provide sucking effects, whereby residence time of the particles in the particle-plate contact zone 35 actually increases, thereby enhancing the capability of the louvers in collecting particles. Absence of any pressure drop may result in a relatively low residence time, with the particles more rapidly swept through the system.

The ribbon or plume of particles is directed between two banks of opposing-facing louvered plates defining the louvered plate separator 25. This louvered plate separator defines the particle-plate contact zone 35 mentioned supra.

A low vacuum, or some other means for imparting low pressure 27, is applied to gas outlets of the separator 25. The low vacuum serves as a means to facilitate deposition of the particles on the various louvers.

Positively charged carbon particles are attracted to the negative electrode 26 while negatively charged mineral particles migrate to the positive electrode 28. The different materials have different surface work functions (dielectric constants) and accordingly take on different charges when in contact with the tribocharger. The combination of external electric force, particle charge to mass ratio, and particle initial velocity result in different trajectories for different types of particles. Lighter particles deposit on the upper (proximal) portion of the louvered plate; whereas, heavier particles collect on the lower (distal) portion of the louvered plate. Those particles which do not become charged go straight through the center between the two louvered plates to an exit portion 38 of the device.

For fly ash separations the separator plates are operated at a potential difference of ±25,000 volts. The voltage difference of 25,000 volts is not inviolate and in fact can be adjusted according to the feed materials and the desired separation patterns. A suitable voltage range is between approximately ±10,000 to ±40,000 volts. The inventors have found that a good operating voltage depends on the composition of the feed which may have different unburned carbon, mineral, and moisture contents. A higher voltage results in a better separation efficiency. As such, high, but non-arching or non-corona-inducing voltages are particularly suitable.

EXAMPLE

A laboratory scaled device was utilized to render the following experimental results. The laboratory louvered plate assembly was approximately 9.5 centimeters wide, 43 centimeters long, and contained several louvered plates.

Each of the louvered plates was angled downwardly and outwardly at approximately 30° from vertical. The angle can be changed to 15° or 45°. The optimum value of the louvered plate's angle would depend upon the characteristics of the feed material (fly ash, fine mineral ore, etc.) and the type of tribocharger used. One could have different configurations of the louvered plate such as curved, ribbed extending perpendicular to gas flow, etc. Different configurations would give different particle capture characteristics.

Surprisingly and unexpectedly, the inventors found that different materials comprising the charging means 24 (e.g., copper versus teflon), and different physical configurations of the louvers 26, 28, along with different louver positioning, all results in different particle deposition patterns. For example, if high CaO content in the product is the desired product, then the product should be collected from the middle section of the positively louvered plate with a copper charger. (See Table 3, line 6—11.9% CaO.) A higher CaO content may be required for some special cements.

If a low $Fe_2O_3$ and a low carbon content is required, then the product should be collected from the middle section of a positive louvered plate separator with a Teflon™ tribocharger. (See, for example, Table 2, line 16—7.08% $Fe_2O_3$ and 2.89% carbon.) The low carbon and low $Fe_2O_3$ may be good for general cement. If a low CaO, low $Fe_2O_3$ and high $SiO_2$ content is desired, then the product should be collected from the middle section of a negatively-charged louvered plate separator with a copper tribocharger. (See Table 3, line 1—2.62% CaO, 9.6% $Fe_2O_3$, and 56.42% $SiO_2$.) Some special cements may require a higher $SiO_2$ content.

From empirical data, the inventors have derived the following particle separation trends.

TABLE 1

Protocol for Selective Particle Collection

| Particle Type | Tribocharger | Plate Polarity | Louver Location |
|---|---|---|---|
| Low Carbon Ash | Teflon ® | Positive | Middle |
| High Carbon Conc. | Copper | Negative | Top |
| High CaO | Copper | Positive | Middle |
| Low $Fe_2O_3$/Low C. | Teflon ® | Positive | Middle |
| High $SiO_2$/ Low CaO Low $Fe_2O_3$ | Copper | Negative | Middle |

Figure 5A:
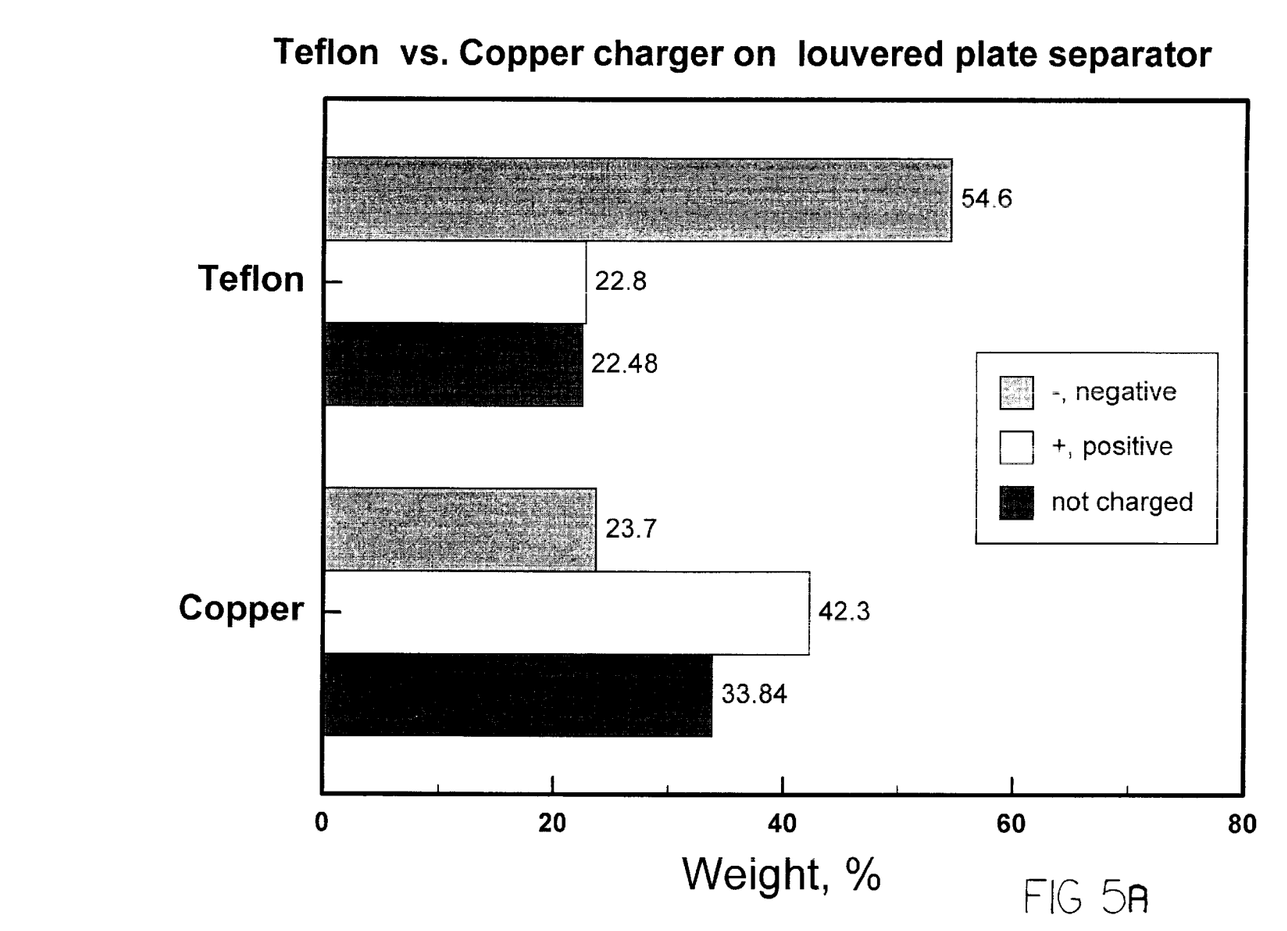
FIGS. 5A–C are bar graphs depicting the total distribution of material on the charged plates, in accordance with features of the present invention.
Figure 5B:
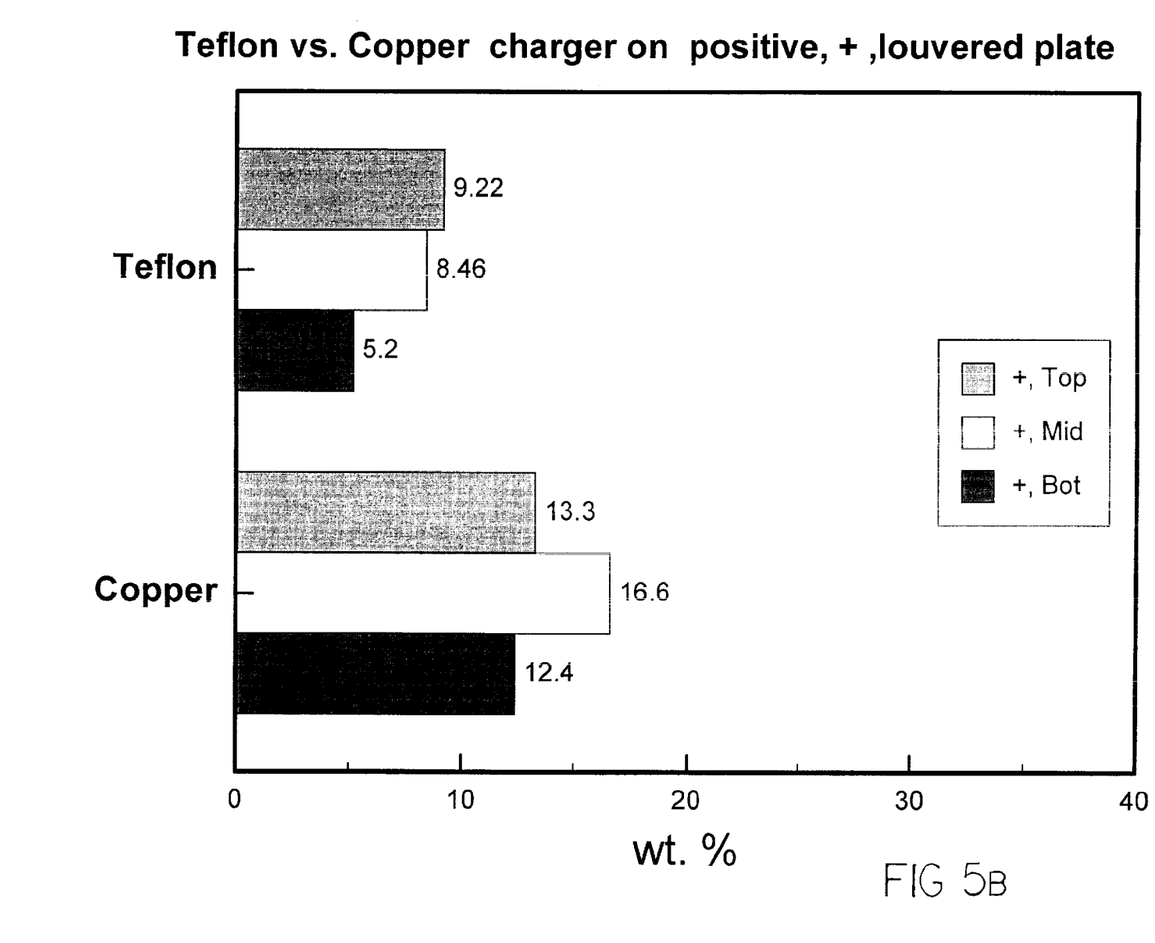
Figure 5C:
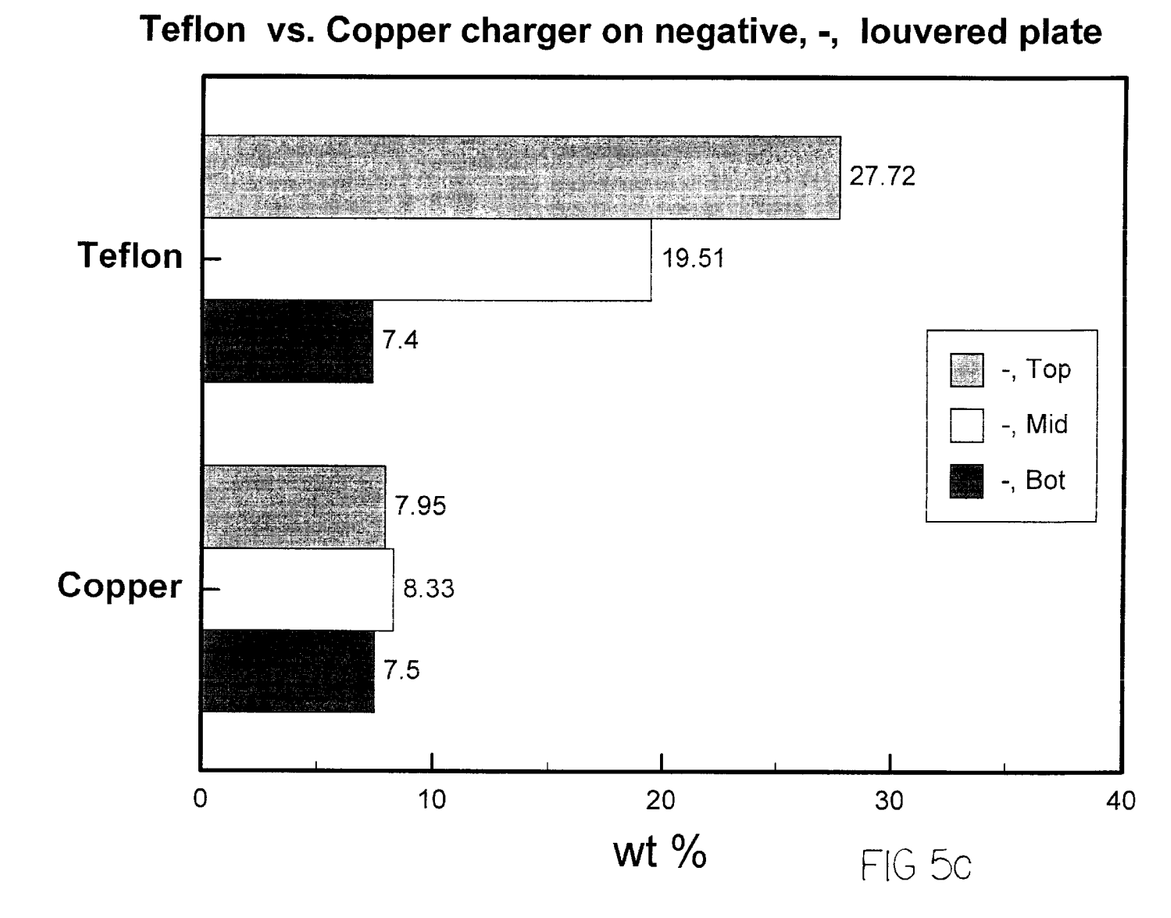

FIGS. 5A–C show the mass distribution on the plates and compare the distributions using Teflon™ and copper chargers. As depicted in FIG. 5A, when copper is utilized in the tribocharger, 66% of the particle feed was charged and collected on the plates. In the case of the Teflon™ tribocharger, the recovery increased to 77% of the feed. The recovery percentage is dependent upon the mineral contents of the fly ash. It is possible that a fly ash with a different mineral content might have a higher percentage recovery with a copper tribocharger.

The deposition pattern of the collected material is also different for the two tribochargers studied. FIG. 5A illustrates that when copper tribocharger is utilized, more product collects on the positive- and uncharged-plates. However, when Teflon™ tribocharger is used, most of the products are deposited on the negative-plates.

FIG. 5B shows that when copper is utilized, a plurality of product is collected on the middle plates (i.e., those plate situated approximately intermediate the flanking plates of the positively-charged louver-bank. Teflon use resulted in a more even distribution across the positively-charged louver-bank.

FIG. 5C depicts that more product is deposited on the upper most louvers when Teflon charging means are utilized. When copper tribochargers are used, a more even distribution of product across negatively-charged louver-banks are realized. Due to the difference of the work functions (copper or Teflon™) versus fly ash, different charging characteristics were observed that resulted in the different deposition patterns in separation. By utilizing different tribochargers, one can achieve different deposition patterns.

Particle extraction results for Teflon™-based tribochargers are given in Table 2. Results obtained when copper was utilized are presented in Table 3.

The top row in each table gives an analysis of 200 grams of fly ash (below 325 mesh). Each successive row indicates the mass of fly ash which deposited on a particular region and the composition of that portion of fly ash in weight percent. The bottom row in each of the two tables gives the calculated mass of fly ash which remain uncharged and passed to the bottom of the separator. The composition of each of those two quantities is given in weight percent. The weight percents do not add up to 100 percent due to the presence of sulfur compounds, $TiO_2$, $P_2O_5$, and moisture in the initial sample of fly ash.

The carbon contents in the collected fractions ranged from 6.15 wt. % to 1.71 wt. % depending on the locations of the regions on the plates and the type of tribocharger utilized. The 6.15 wt. % was obtained on the top of a positively charged plate and using a copper tribocharger; however, the total fly ash mass in that region was 26.6 grams. Using Teflon tribocharger, 55.44 grams of fly ash with a carbon content of 4.33 wt. % deposited on the top of a negatively charged plate. A larger mass of carbon deposited on the top of a negative plate from a Teflon tribocharger than did deposit on the top of a positive plate with a copper tribocharger. The $Al_2O_3$ contents in the products ranged from 19.75 wt. % to 24.15 wt. %. The CaO in the products can be varied from 2.39 wt. % to 11.93 wt. %. The $Fe_2O_3$ was found to be between 7.08 wt. % and 16.83 wt. % and the $SiO_2$ from 37.63 wt. % to 58.37 wt. %.

TABLE 2

Detailed analyses of the products from louvered plate separator[a].

| TEFLON ™ | Mass | Carbon | $Al_2O_3$ | CaO | $Fe_2O_3$ | $SiO_2$ | $K_2O$ | MgO | $Na_2O$ |
|---|---|---|---|---|---|---|---|---|---|
| Coal ash, Raw | 200 | 3.54 | 22.47 | 5.91 | 13.11 | 47.93 | 1.51 | 1.14 | 1.16 |
| Louvered, −, top | 55.44 | 4.33 | 20.95 | 8.61 | 15.97 | 43.26 | 1.32 | 1.31 | 0.98 |
| Louvered, −, middle | 39.01 | 3.89 | 22.58 | 7.28 | 14.08 | 44.77 | 1.52 | 1.24 | 1.18 |
| Louvered, −, bottom | 14.80 | 3.82 | 23.31 | 5.92 | 14.12 | 45.33 | 1.52 | 1.24 | 1.18 |
| Louvered, +, top | 18.45 | 3.63 | 21.71 | 2.73 | 8.66 | 57.6 | 1.56 | 0.76 | 1.14 |
| Louvered, +, middle | 16.93 | 2.89 | 24.01 | 2.39 | 7.08 | 58.37 | 1.74 | 0.8 | 1.23 |
| Louvered, +, bottom | 10.4 | 3.74 | 24.32 | 2.76 | 8.53 | 54.4 | 1.72 | 0.87 | 1.23 |
| Louvered, uncharged (calculated) | 44.97 | 2.33 | 23.27 | 4.74 | 13.56 | 47.89 | 1.63 | 1.1 | 1.41 |

[a]The numbers for carbon through $Na_2O$ are weight percent and do not account for sulfur compounds and moisture.

TABLE 3

Detailed analyses of the products from louvered plate separator[a].

| COPPER | Mass | Carbon | $Al_2O_3$ | CaO | $Fe_2O_3$ | $SiO_2$ | $K_2O$ | MgO | $Na_2O$ |
|---|---|---|---|---|---|---|---|---|---|
| Coal ash, Raw | 200 | 3.54 | 22.47 | 5.91 | 13.11 | 47.93 | 1.51 | 1.14 | 1.16 |
| Louvered, −, top | 15.9 | 2.79 | 22.58 | 2.67 | 10.55 | 56.3 | 1.58 | 0.8 | 1.16 |
| Louvered, −, middle | 16.67 | 1.71 | 24.15 | 2.62 | 9.6 | 56.42 | 1.71 | 0.85 | 1.23 |
| Louvered, −, bottom | 15 | 2.6 | 24.34 | 2.83 | 10.21 | 54.41 | 1.73 | 0.9 | 1.27 |
| Louvered, +, top | 26.6 | 6.15 | 19.75 | 11.5 | 16.83 | 37.63 | 1.19 | 1.5 | 0.91 |
| Louvered, +, middle | 33.25 | 4.34 | 21.43 | 11.9 | 13.72 | 39.88 | 1.3 | 1.61 | 1 |
| Louvered, +, bottom | 24.9 | 4.44 | 21.54 | 11.7 | 13.31 | 40.48 | 1.3 | 1.3 | 1.02 |
| Louvered, uncharged (calculated) | 67.68 | 2.62 | 23.53 | 0.86 | 13.37 | 53.63 | 1.69 | 0.9 | 1.34 |

[a]The numbers for carbon through $Na_2O$ are weight percent and do not account for sulfur compounds and moisture.

The combined effects of sieving and triboseparation are not obvious from the two tables supra. The following table, Table 4, illustrates that effect. Subjecting −325 mesh fly ash with an original carbon content of 5.87 wt. % to both dry sieving and triboseparation increases the carbon content of a separated fly ash fraction to as much as 38.72 wt. %. Subjecting +200 mesh fly ash (having an original carbon content of 20 wt. %) to both dry sieving and triboseparation increases the carbon content of a separated fly ash fraction to as much as 60 wt. %.

The enhancement of carbon content to 38.72 wt. % to 5.87 wt. % significantly increases the value of the separated product. This product can be directly shipped back to the boiler to be burned, or it can be used for other purposes such as a sorbent, or an application as a low-grade activated carbon.

TABLE 4

Effects of the Combination of
Dry Sieving and Triboseparation[b]

| | Carbon, wt. %, Positive-Charged louvered plate | Carbon, wt %, Negative-Charged louvered plate |
|---|---|---|
| Fly ash, 5.87% C (−325 mesh) | | |
| Top | 2.81 | 38.72 |
| Middle | 1.5 | 29.6 |
| Bottom | 1.85 | 29.6 |
| Fly ash, 20% C (+200 mesh) | | |
| Top | 13 | 60 |
| Middle | 10 | 56 |
| Bottom | 11 | 56 |

[b]Top, middle, and bottom refer to the three main regions of each of the two charged louvered plates. The middle and right-hand columns are for the positively charged and negatively charged louvered plates, respectively.

While the invention has been described with reference to details of the illustrated embodiment, these details are not intended to limit the scope of the invention as defined in the appended claims.

What is claimed is:

1. A process for removing organic and inorganic particles, based on their electric charge and size, from a dry mixture comprising:
   a) sizing the mixture into a plurality of particle fractions;
   b) isolating the fractions from each other;
   c) transporting the particles through a venturi feed system;
   d) contacting the particles to a plurality of charge inducing substrates selected from the group consisting of copper, polytetra-fluoroethylene, Nylon, and aluminum, to create charged and uncharged particles;
   e) subjecting the particles to an electric field comprising a first set of positively charged plates arranged colinearly with each other and wherein each of the plates of the first set are spaced from each other to define a plurality of channels, and a second set of negatively charged places arranged colinearly with each other, wherein each of the plates of the second set are spaced from each other to define a plurality of channels, and wherein the second set is juxtaposed to the first set to define a passage between the first set and the second set; and
   f) collecting the separated particles.

2. The process as recited in claim 1 wherein the use of different charge-inducing substrates gives rise to different separation patterns of the mixture components on the charged regions.

3. The process as recited in claim 1 wherein the uncharged particles do not contact the charged regions.

4. The method as recited in claim 1 wherein the first set and second set of plates extend in a direction opposite the location of the means for imparting a venturi effect.

5. The method as recited in claim 1 wherein the electrical field has a voltage of between 10,000 volts and 40,000 volts.

6. The method as recited in claim 1 wherein neutral charged particles pass through the passage without contacting the first set of plates or the second set of plates.

7. A device for separating particles from a mixture, the device comprising:
   a) a means for sizing the particles;
   b) a venturi feed system for transporting the particles;
   c) a tribo-charger having charge inducing surfaces for imparting a positive charge, negative charge, or neutral charge to the particles;
   d) a first set of positively charged plates arranged colinearly with each other and wherein each of the plates of the first set are spaced from each other to define a plurality of channels: and a second set of negatively charged places arranged colinearly with each other, wherein each of the plates of the second set are spaced from each other to define a plurality of channels, and wherein the second set is juxtaposed to the first set to define a passage between the first set and the second set for separating the particles; and
   e) a means for collecting the particles.

8. The device as recited in claim 7 wherein the tribo-charge surface is comprised of a material selected from the group consisting of copper, polytetrafluoroethylene, Nylon, stainless steel, plastic, and aluminum.

9. The device as recited in claim 8 wherein the material is configured as a conduit.

10. The device as recited in claim 7 wherein the first set and second set extend in a direction opposite the location of the Venturi feed system.

11. The device as recited in claim 7 wherein the passage is adapted to receive neutral charged particles.

12. The device as recited in claim 7 wherein the channels are in fluid communication with a means for imparting negative pressure to the channels.

13. The device as recited in claim 7 wherein different means for imparting an electric charge gives rise to different separation patterns of the fly ash components on the collecting means.

* * * * *